United States Patent
Evstatieva et al.

(10) Patent No.: US 8,530,563 B2
(45) Date of Patent: Sep. 10, 2013

(54) PROCESS FOR THE PREPARATION OF AQUEOUS POLYMER DISPERSIONS FROM A AROMATIC COMPOUND, A CONJUGATED ALIPHATIC DIENE AND AN ETHYLENICALLY UNSATURATED CARBONITRILE

(75) Inventors: Elitsa Evstatieva, Mannheim (DE); Juergen Schmidt-Thuemmes, Neuhofen (DE); Dirk Lawrenz, Hassloch (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/532,062

(22) Filed: Jun. 25, 2012

(65) Prior Publication Data
US 2012/0276399 A1    Nov. 1, 2012

Related U.S. Application Data

(62) Division of application No. 13/129,327, filed as application No. PCT/EP2009/065535 on Nov. 20, 2009, now Pat. No. 8,329,803.

(30) Foreign Application Priority Data

Nov. 25, 2008   (EP) .................................. 08169908

(51) Int. Cl.
*C08K 3/22*       (2006.01)
*B32B 27/10*      (2006.01)
(52) U.S. Cl.
USPC .......................................... 524/432; 428/514
(58) Field of Classification Search
USPC ........................................................ 524/432
See application file for complete search history.

(56) References Cited

U.S. PATENT DOCUMENTS

| | | | |
|---|---|---|---|
| 3,234,302 A * | 2/1966 | Wacome | 525/261 |
| 4,155,888 A | 5/1979 | Mooth | |
| 5,147,907 A * | 9/1992 | Rinck et al. | 524/48 |
| 5,358,998 A * | 10/1994 | Wendel et al. | 524/734 |
| 5,536,779 A | 7/1996 | Wendel et al. | |
| 2005/0176878 A1* | 8/2005 | Ettl et al. | 524/571 |
| 2008/0255301 A1* | 10/2008 | Gaschler et al. | 524/812 |
| 2010/0204382 A1 | 8/2010 | Evstatieva et al. | |
| 2011/0305916 A1 | 12/2011 | Schmidt-Thümmes et al. | |

FOREIGN PATENT DOCUMENTS

| | | |
|---|---|---|
| EP | 0 536 597 | 4/1993 |
| GB | 1 063 422 | 3/1967 |
| WO | 99 09251 | 2/1999 |
| WO | 03 091300 | 11/2003 |
| WO | 2009 047233 | 4/2009 |
| WO | WO 2009/047233 A1 | 4/2009 |

OTHER PUBLICATIONS

International Search Report Issued Jan. 25, 2010 in PCT/EP09/065535 filed Nov. 20, 2009.
International Preliminary Report on Patentability and Written Opinion issued May 31, 2011 in PCT EP/2009/065535.

* cited by examiner

*Primary Examiner* — Hui Chin
(74) *Attorney, Agent, or Firm* — Oblon, Spivak, McClelland, Maier & Neustadt, L.L.P.

(57) ABSTRACT

A process for the preparation of aqueous polymer dispersions is described, a vinylaromatic compound, such as, for example, styrene, a conjugated aliphatic diene, such as, for example, butadiene, and an ethylenically unsaturated carbonitrile, such as, for example, acrylonitrile, being copolymerized in an aqueous medium. The copolymerization is effected in the presence of a degraded starch and of free radical initiators. At least part of the monomers differing from ethylenically unsaturated carbonitriles are polymerized before the ethylenically unsaturated carbonitriles are added to the polymerization mixture.

15 Claims, No Drawings

PROCESS FOR THE PREPARATION OF AQUEOUS POLYMER DISPERSIONS FROM A AROMATIC COMPOUND, A CONJUGATED ALIPHATIC DIENE AND AN ETHYLENICALLY UNSATURATED CARBONITRILE

This application is a divisional application of U.S. Ser. No. 13/129,327 filed on May 13, 2011 which is a 371 application of PCT/EP2009/065535 filed on Nov. 20, 2009.

The invention relates to a process for the preparation of aqueous polymer dispersions, a vinylaromatic compound, a conjugated aliphatic diene and an ethylenically unsaturated carbonitrile being copolymerized in an aqueous medium in the presence of a degraded starch and of free radical initiators, the ethylenically unsaturated carbonitriles being added only when at least a part of the other monomers has been polymerized. The invention also relates to aqueous polymer dispersions prepared by the process and to the use thereof as a binder, adhesive, size for fibers, for the production of coverings or for the preparation of a paper coating slip.

EP-A 0 536 597 discloses aqueous polymer dispersions which are obtainable by free radical emulsion polymerization of unsaturated monomers in the presence of at least one starch degradation product which is prepared by hydrolysis of native starch or chemically modified starch in the aqueous phase and has a weight average molecular weight Mw of from 2500 to 25 000. For example, monomer mixtures which comprise from 50 to 100% by weight of esters of acrylic acid and/or methacrylic acid with alcohols having 1 to 12 carbon atoms and/or styrene or from 70 to 100% by weight of styrene and/or butadiene are used as unsaturated monomers. The polymer dispersions are used as a binder, adhesive, size for fibers or for the production of coverings.

WO 99/09251 discloses a starch-copolymer product and a process for its preparation. The starch-copolymer product can be considered as a reaction product of starch and at least one monomer which is capable of free radical polymerization: In order to prepare aqueous dispersions of such products, an aqueous solution or dispersion of a degraded starch which has an intrinsic viscosity η of from 0.07 to 0.35 dl/g in aqueous solution at a temperature of 25° C. is used. The polymerization is carried out in such a way that first a part of the monomers and of the free radical initiator is added to the aqueous solution or dispersion of the degraded starch, which solution or dispersion has been heated to the polymerization temperature, and, after the polymerization has started, further portions of monomers and initiator are metered in, at least 75% of the total monomers being added after more than one hour after the initiation of the polymerization. The dispersions are used for the production of coverings and as binders for paper products. The binding power of such products is, however, insufficient.

WO 03/091300 discloses aqueous polymer dispersions which are obtainable by free radical copolymerization of (a) from 0.1 to 99.9% by weight of styrene and/or methylstyrene, (b) from 0.1 to 99.9% by weight of 1,3-butadiene and/or isoprene and (c) from 0 to 40% by weight of other ethylenically unsaturated monomers, the sum of the monomers (a), (b) and (c) being 100, in the presence of from 10 to 40% by weight, based on the monomers used, of at least one degraded starch having a molecular weight Mn of from 500 to 40 000 and a water-soluble redox catalyst. These polymer dispersions are used as engine sizes and surface sizes for paper, board and cardboard. Since they have a poor binding power, they are not suitable, for example, as binders for paper coating slips.

Known binders for paper coating slips based on copolymers of vinylaromatic compounds and aliphatic dienes are not yet completely satisfactory in every respect. In particular, binders having a high binding power and paper coating slips comprising a binder and having a good surface strength, e.g. a good dry pick resistance and a good wet pick resistance, are desired. In the case of aqueous emulsion copolymers of vinylaromatic compounds, aliphatic dienes and acrylonitrile, there is the danger of instabilities since undesired coagulum formation can occur.

It is the object of the invention to provide aqueous polymer dispersions based on copolymers of vinylaromatics and conjugated aliphatic dienes, it being necessary for the dispersions to ensure a high binding power, as little coagulum formation as possible and, on use in paper coating slips, a good surface strength and good running behavior on high-speed machines.

The object is achieved, according to the invention, by a process for the preparation of aqueous polymer dispersions,
(a) at least one vinylaromatic compound,
(b) at least one conjugated aliphatic diene and
(c) at least one ethylenically unsaturated carbonitrile
being copolymerized in an aqueous medium, the copolymerization of the monomers being effected in the presence of a degraded starch and of free radical initiators, and at least a part of the monomers differing from ethylenically unsaturated carbonitriles being polymerized before the ethylenically unsaturated carbonitriles are added to the polymerization mixture. According to the invention, this means that in any case no substantial amounts of ethylenically unsaturated carbonitriles are present in the polymerization mixture at the beginning of the polymerization reaction. Substantial amounts are those amounts which lead to a substantial amount of coagulum, in particular to 100 ppm or more of a coagulum, in the polymerization. Polymerization mixture is the mixture of initially taken monomers or monomers added to the polymerization vessel and polymer already formed.

Preferably,
(a) from 19.8 to 80 parts by weight of at least one vinylaromatic compound,
(b) from 19.8 to 80 parts by weight of at least one conjugated aliphatic diene,
(c) from 0.1 to 19 parts by weight of at least one ethylenically unsaturated carbonitrile,
(d) from 0.1 to 10 parts by weight of at least one ethylenically unsaturated acid and
(e) from 0 to 20 parts by weight of at least one other monoethylenically unsaturated monomer
are used, the sum of the parts by weight of the monomers (a) to (e) being 100.

The aqueous polymer dispersions are obtainable, for example, by using monomer mixtures comprising
(a) from 19.8 to 80, preferably from 25 to 70, parts by weight of styrene and/or methylstyrene,
(b) from 19.8 to 80, preferably from 25 to 70, parts by weight of 1,3-butadiene and/or isoprene,
(c) from 0.1 to 19 parts by weight of acrylonitrile and/or methacrylonitrile,
(d) from 0.1 to 10 parts by weight of at least one ethylenically unsaturated acid and
(e) from 0 to 20 parts by weight of at least one other monoethylenically unsaturated monomer
in the emulsion copolymerization, the sum of the parts by weight of the monomers (a) to (e) being 100.

Suitable monomers of group (a) are vinylaromatic compounds, e.g. styrene, α-methylstyrene and/or vinyltoluene. From this group of monomers, styrene is preferably used. 100 parts by weight of the monomer mixtures used altogether in the polymerization comprise, for example, from 19.8 to 80 parts by weight and preferably from 25 to 70 parts by weight of at least one monomer of group (a).

Monomers of group (b) are, for example, 1,3-butadiene, isoprene, 1,3-pentadiene, 1,3-dimethylbutadiene and cyclopentadiene. From this group of monomers, 1,3-butadiene and/or isoprene are preferably used. 100 parts by weight of the monomer mixtures which are used altogether in the emulsion polymerization comprise, for example, from 19.8 to 80 parts by weight, preferably from 25 to 70 parts by weight and in particular from 25 to 60 parts by weight of at least one monomer of group (b).

Monomers of group (c) are, for example, acrylonitrile and methacrylonitrile. The monomers of group (c) are used, for example, in an amount of from 0.1 to 19 parts by weight, preferably from 2 to 12 parts by weight and in particular from 4 to 9 parts by weight per 100 parts by weight of the monomer mixtures.

Monomers of group (d) are, for example, ethylenically unsaturated carboxylic acids, ethylenically unsaturated sulfonic acids and vinylphosphonic acid. Preferably used ethylenically unsaturated carboxylic acids are $\alpha,\beta$-monoethylenically unsaturated mono- and dicarboxylic acids having 3 to 6 carbon atoms in the molecule. Examples of these are acrylic acid, methacrylic kid, itaconic acid, maleic acid, fumaric acid, crotonic acid, vinylacetic acid and vinyllactic acid. Suitable ethylenically unsaturated sulfonic acids are, for example, vinylsulfonic acid, styrene sulfonic acid, acrylamidomethylpropanesulfonic acid, sulfopropyl acrylate and sulfopropyl methacrylate.

The monomers of group (d) which comprise acid groups can be used in the polymerization in the form of the free acids and in the form partly or completely neutralized with suitable bases. Sodium hydroxide solution or potassium hydroxide solution or ammonia is preferably used as the neutralizing agent. 100 parts by weight of the monomer mixtures which are used in the emulsion polymerization comprise, for example, from 0.1 to 10 parts by weight, preferably from 0.1 to 8 parts by weight or from 1 to 6 parts by weight of at least one monomer of group (d).

Suitable monomers of group (e) are other monoethylenically unsaturated compounds. Examples of these are ethylenically unsaturated carboxamides, such as, in particular, acrylamide and methacrylamide, vinyl esters of saturated C1- to C18-carboxylic acids, preferably vinyl acetate, and esters of acrylic acid and of methacrylic acid with monohydric C1- to C18-alcohols, such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate, allyl esters of saturated carboxylic acids, vinyl ethers, vinyl ketones, dialkyl esters of ethylenically unsaturated carboxylic acids, N-vinylpyrrolidone, N-vinylpyrrolidine, N-vinylformamide, N, N-dialkytaminoalkyl-acrylamides, N,N-dialkylaminoalkylmethacrylamides, N,N-dialkylaminoalkyl acrylates, N,N-dialkylaminoalkyl methacrylates, vinyl chloride and vinylidene chloride. This group of monomers is, if appropriate, used for modifying the polymers. 100 parts by weight of the monomer mixtures used in the emulsion polymerization comprise, for example, from 0 to 20 parts by weight or from 0.1 to 15 parts by weight and in particular from 0.5 to 10 parts by weight of at least one monomer of group (d).

For example, from 15 to 60 parts by weight of degraded starch are used per 100 parts by weight of the monomers in the emulsion polymerization. All native starches, such as starches from corn, wheat, oats, barley, rice, millet, potatoes, peas, tapioca, sorghum or sago, are suitable as starting starches for the preparation of the degraded starches to be used according to the invention. Also of interest are those natural starches which have a high amylopectin content, such as waxy corn starch and waxy potato starch. The amylopectin content of these starches is above 90%, in general from 95 to 100%. Starches modified chemically by etherification or esterification can also be used for the preparation of the polymer dispersions according to the invention. Such products are known and are commercially available. They are prepared, for example, by esterification of a native starch or degraded native starch with inorganic or organic acids or anhydrides or chlorides thereof. Of particular interest are phosphated and acetylated degraded starches. The commonest method for etherifying starches consists in treating starch with organic halogen compounds, epoxides or sulfates in aqueous alkaline solution. Known starch ethers are alkyl ethers, hydroxyalkyl ethers, carboxyalkyl ethers and allyl ethers. Reaction products of starches with 2,3-epoxypropyltrimethylammonium chloride are also suitable. Degraded native starches, in particular native starches degraded to give maltodextrin, are particularly preferred. Further suitable starches are cationically modified starches, i.e. starch compounds which have amino groups or ammonium groups.

The degradation of the starches can be effected enzymatically, oxidatively or hydrolytically by the action of acids or bases. Degraded starches are commercially available. However, a natural starch can also, for example, first be degraded enzymatically in an aqueous medium and, after stopping of the enzymatic degradation in the aqueous solution or dispersion of the degraded starch prepared thereby, the emulsion polymerization of the monomers can be carried out according to the invention. The degraded starches have, for example, an intrinsic viscosity $\eta i$ of less than 0.07 dl/g or less than 0.05 dl/g. The intrinsic viscosity $\eta i$ of the degraded starches is preferably in the range from 0.02 to 0.06 dl/g. The intrinsic viscosity $\eta i$ is determined according to DIN EN1628 at a temperature of 23° C.

The amounts of degraded starch which are used in the emulsion polymerization are preferably from 20 to 50 parts by weight, in particular from 30 to 45 parts by weight, based on 100 parts by weight of the monomers to be polymerized.

In a preferred embodiment of the process according to the invention, from 1 to 10% by weight of the monomers to be polymerized altogether are initially taken, together with the aqueous solution or the dispersion of the degraded starch and at least 30% by weight of the initiator, in the aqueous medium. In the case of the initially taken monomers, preferably no ethylenically unsaturated carbonitrile, in particular no acrylonitrile is present. The remaining monomers and remaining initiator are then metered into the initially taken mixture after the start of the polymerization under polymerization conditions, but separately from one another. In the emulsion polymerization, preferably a degraded native starch having an intrinsic viscosity $\eta i$ of from 0.02 to 0.06 dl/g is used. Polymerization conditions is to be understood as meaning that the initially taken reaction mixture has been heated to the required temperature at which the polymerization takes place. These temperatures are, for example, from 80 to 130° C., preferably from 90 to 120° C. The polymerization is preferably carried out under pressure, for example at pressures up to 15 bar, e.g. from 2 to 10 bar.

Usually; initiators which form free radicals under the reaction conditions are used in the process according to the invention. Suitable polymerization initiators are, for example, peroxides, hydroperoxides, hydrogen peroxide, sodium or potassium persulfate, redox catalysts and azo compounds, such as 2,2-azobis(4-methoxy-2,4-dimethylvaleronitrile), 2,2-azobis(2,4-dimethylvaleronitrile) and 2,2-azobis(2-amidinopropane)dihydrochloride. Examples of further suitable initiators are dibenzoyl peroxide, tert-butyl perpivalate, tert-butyl-per-2-ethylhexanoate, di-tert-butyl peroxide, diamyl peroxide, dioctanoyl peroxide, didecanoyl peroxide, dilauroyl peroxide, bis(o-toluyl) peroxide, succinyl peroxide, tert-butyl peracetate, tert-butyl permaleate, tert-butyl perisobutyrate, tert-butyl perpivalate, tert-butyl peroctanoate tert-butyl perbenzoate, tert-butyl hydroperoxide, azobisisobutyronitrile, 2,2'-azobis(2-methylbutyronitrile), 2,2'-azobis(2,4-dimethylvaleronitrile) and 2,2'-azobis(N,N'-dimethyleneisobutyramidine)dihydrochloride. Initiators selected from the group consisting of the peroxodisulfates, peroxosulfates, azo initiators, organic peroxides, organic hydroperoxides and hydrogen peroxide are preferred. Water-soluble initiators are particularly preferably used, e.g. sodium persulfate, potassium persulfate, ammonium persulfate, sodium peroxodisulfate, potassium peroxodisulfate and/or ammonium peroxodisulfate. The polymerization can also be initiated with the aid of high-energy radiation, such as electron beams, or by irradiation with UV light.

The initiators are used, for example, in amounts of up to 2% by weight, preferably of at least 0.9% by weight, e.g. from 1.0 to 1.5% by weight, based on the monomers to be polymerized. Preferably, at least 30% by weight of the initiators are initially taken together with the degraded starch in the aqueous medium and the monomers and the remaining initiators are metered into this initially taken mixture under polymerization conditions.

In order to prepare the polymer dispersions according to the invention, for example, an aqueous solution of the degraded starch described above and preferably at least 30% by weight of the amount of initiator required altogether are initially taken in a heatable reactor which is equipped with a mixing apparatus. The amount of initiator in the initially taken mixture is preferably not more than 90% by weight, in general not more than 60% by weight, of the amount required altogether for polymerizing the monomers. The degraded starch results in good dispersing of the monomers and stabilization of the resulting finely divided polymers. In the emulsion polymerization, there is at least partial grafting of the degraded starch, which is thereby firmly incorporated into the resulting polymer.

The protective colloids and/or emulsifiers usually employed as dispersants can be used for promoting the dispersing of the monomers in the aqueous medium. A detailed description of suitable protective colloids is to be found in Houben-Weyl, Methoden der organischen Chemie, volume XIV/1, Makromolekulare Stoffe, Georg-Thieme-Verlag, Stuttgart, 1961, pages 411 to 420. Suitable emulsifiers are surface-active substances whose number average molecular weight is usually below 2000 g/mol and preferably below 1500 g/mol, while the number average molecular weight of the protective colloids is above 2000 g/mol, for example from 2000 to 100 000 g/mol, in particular from 5000 to 50 000 g/mol.

Suitable emulsifiers are, for example, ethoxylated C8- to C36-fatty alcohols having a degree of ethoxylation of from 3 to 50, ethoxylated mono-, di- and tri-C4- to C12-alkylphenols having a degree of ethoxylation of from 3 to 50, alkali metal salts of dialkyl esters of sulfosuccinic acid, alkali metal and ammonium salts of C8- to C12-alkylsulfates, alkali metal and ammonium salts of C12- to C18-alkanesulfonic acids and alkali metal and ammonium salts of C9- to C18-alkylarylsulfonic acids. Cationic emulsifiers are, for example, compounds having at least one amino or ammonium group and at least one C8-C22-alkyl group. If emulsifiers and/or protective colloids are concomitantly used as assistants for dispersing the monomers, the amounts thereof which are used are, for example, from 0.1 to 5% by weight, based on the monomers.

Moreover, the initially taken mixture may also comprise a polystyrene seed, i.e. an aqueous dispersion of finely divided polystyrene having a particle diameter of from 20 to 40 nm.

In order to modify the properties of the polymers, the emulsion polymerization can, if appropriate, be carried out in the presence of at least one polymerization regulator. Examples of polymerization regulators are organic compounds which comprise sulfur in bound form, such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea. Further polymerization regulators are aldehydes, such as formaldehyde, acetaldehyde and propionaldehyde, organic acids, such as formic acid, sodium formate or ammonium formate, alcohols, such as, in particular, isopropanol, and phosphorous compounds, such as sodium hypophosphite. If a regulator is used in the polymerization, the amount used in each case is, for example, from 0.01 to 5, preferably from 0.1 to 1, % per weight, based on the monomers used in the polymerization. The regulators are preferably metered into the initially taken mixture together with the monomers. However, they may also be partly or completely present in the initially taken mixture. They may also be metered in a stepwise manner staggered with respect to the monomers.

The emulsion polymerization is effected in an aqueous medium. This may be, for example, demineralized water or a mixture of water and a solvent miscible therewith, such as methanol, ethanol or tetrahydrofuran. In order to polymerize the monomers, an aqueous solution of the degraded starch is first prepared. This solution can, if appropriate, comprise a protective colloid and/or an emulsifier in dissolved form and, if appropriate, a polystyrene seed. The aqueous solution used as an initially taken mixture is preferably heated to the temperature at which the polymerization of the monomers is to take place or to a temperature which is, for example, from 5 to 20° C. below the polymerization temperature, before at least 30% of the amount of initiator required altogether is added to the initially taken mixture. As soon as the polymerization temperature desired in each case has been reached or within a time span of from 1 to 15 minutes, preferably from 5 to 15 minutes, after the polymerization temperature has been reached, the metering of the monomers is begun. They can be pumped into the reactor, for example, continuously within, for example, from 60 minutes to 10 hours, in general within from 2 to 4 hours.

At least with regard to the ethylenically unsaturated carbonitriles, stepwise addition is effected. In this procedure, at least part of the monomers differing from ethylenically unsaturated carbonitriles is initially taken or is metered into the initially taken mixture before the addition of the ethylenically unsaturated carbonitriles is begun. In a preferred embodiment, at least 10, particularly preferably at least 20 or at least 30% by weight, based on the total amount of all monomers, of monomers differing from ethylenically unsaturated carbonitriles are initially taken in the aqueous medium under polymerization conditions and/or are added to the polymerization mixture under polymerization conditions before the addition of ethylenically unsaturated carbonitriles is started. For example, at least one, particularly preferably at least 3 or at least 5% by weight of the monomers can be initially taken before the feed of the remaining monomers is started. At the beginning of the addition of ethylenically unsaturated carbonitriles, the polymerization mixture preferably comprises at least 10, preferably at least 20 or at least 30 parts by weight of (carbonitrile-free) polymer which is already formed. In particular, preferably at least 10, particularly preferably at least 20 or at least 30% by weight of the monomers differing from ethylenically unsaturated carbonitriles, in particular styrene and 1,3-butadiene, have already been polymerized before the addition of ethylenically unsaturated carbonitriles is begun.

In the polymer particles produced according to the invention, units derived from ethylenically unsaturated carbonitriles, in particular from acrylonitrile, are presumably present predominantly on the surface or in an outer layer of the polymer particles. The core of the polymer particles presumably has a lower concentration of units derived from ethylenically unsaturated carbonitriles than the shell.

Stepwise addition of the remaining monomers is also possible, in particular stepwise addition of the monomers d). In a preferred embodiment of the process according to the invention, from 1 to 10% by weight of the monomers to be polymerized altogether are initially taken. Here, the monomers are initially taken in the reactor, preferably together with the abovementioned constituents, and the reactor content is then heated to the polymerization temperature, at least 30% by weight of the amount of initiator preferably being added shortly before the polymerization temperature is reached, as described above, and the remaining monomers then being metered as stated above. According to the invention, no ethylenically unsaturated carbonitriles are present in the initially taken monomers. This means, according to the invention, that in any case substantial amounts of ethylenically unsaturated carbonitriles are not present. Here, substantial amounts are those amounts which lead to a substantial amount of coagulum, in particular to 100 ppm or more of coagulum, during the polymerization.

After the end of the polymerization, if appropriate further initiator can be added to the reaction mixture and a post polymerization can be carried out at the same temperature as or a lower or higher temperature than the main polymerization. For completing the polymerization reaction, it is sufficient in most cases to stir the reaction mixture after addition of all monomers, for example for a further from 1 to 3 hours at the polymerization temperature.

The pH may be, for example, from 1 to 5 during the polymerization. After the polymerization, the pH is adjusted, for example, to a value of from 6 to 7. Virtually coagulum-free aqueous dispersions are obtained. The amount of coagulum is in the ppm range and is preferably less than 100 ppm, in particular less than 50 ppm.

An aqueous polymer dispersion whose dispersed particles have an average particle diameter of, preferably, from 80 to 150 nm is obtained. The average particle diameter of the polymer particles can be determined by dynamic light scattering on a 0.005 to 0.01% strength by weight aqueous polymer dispersion at 23° C. with the aid of an Autosizer IIC from Malvern Instruments, England. The data are based in each case on the average diameter of the cumulant evaluation (cumulant z-average) of the measured autocorrelation function according to ISO standard 13321.

In an embodiment, the solids content of the aqueous polymer dispersion according to the invention is more than 55% by weight, e.g. at least 60% by weight. A correspondingly higher solids content can be obtained by corresponding adjustment of the amount of water used in the emulsion polymerization and/or the amount of monomers.

In an embodiment, the emulsion copolymerization is effected in the absence of emulsifier and/or without using polymer seed.

The aqueous polymer dispersions according to the invention are used as a binder, adhesive, size for fibers, for the production of coverings or for the preparation of paper coating slips. The aqueous polymer dispersions according to the invention are suitable both for the sizing of textile fibers and for the sizing of mineral fibers, in particular glass fibers. Owing to their good adhesive power, in particular for the use of comonomers which lead to a low glass transition temperature of the copolymer (e.g. less than 20° C.), they can also be used as an adhesive and for the production of coverings. Preferably, the aqueous polymer dispersions according to the invention are used as a binder in paper coating slips.

The invention therefore also relates to a paper coating slip comprising
(i) inorganic pigments and
(ii) an aqueous polymer dispersion described above and obtainable by the process according to the invention and, if appropriate, further additives.

In addition to water, paper coating slips generally comprise pigments, binders and assistants for establishing the required rheological properties, e.g. thickeners. The pigments are usually dispersed in water. The paper coating slip comprises pigments in an amount of, preferably, at least 80% by weight, e.g. from 80 to 95% by weight or from 80 to 90% by weight, based on the total solids content. In particular, white pigments are suitable. Suitable pigments are, for example, metal salt pigments, such as, for example, calcium sulfate, calcium aluminate sulfate, barium sulfate, magnesium carbonate and calcium carbonate, of which carbonate pigments, in particular calcium carbonate, are preferred. The calcium carbonate may be natural ground calcium carbonate (GCC), precipitated calcium carbonate (PCC), lime or chalk. Suitable calcium carbonate pigments are available, for example, as Covercarb® 60, Hydrocarb® 60 or Hydrocarb® 90 ME. Further suitable pigments are, for example silicic acids, aluminum oxides, aluminum hydroxide, silicates, titanium dioxide, zinc oxide, kaolin, alumina, talc or silicone dioxide. Suitable further pigments are available, for example, as Capim® MP 50 (Clay), Hydragloss® 90 (Clay) or Talcum 010.

The paper coating slip comprises at least one binder. The polymer dispersion prepared according to the invention can be used in the paper coating slip as the sole binder or in combination with further binders. The most important functions of binders in paper coating slips are to bind the pigments to the paper and the pigments to one another and partly to fill cavities between pigment particles. For example, from 1 to 50 parts by weight, preferably from 1 to 25 parts by weight or from 5 to 20 parts by weight, per 100 parts by weight of pigment, of an organic binder are used (solid, i.e. without water or other solvents which are liquid at 21° C., 1 bar).

Suitable further binders are binders having a natural base, in particular starch-based binders, and synthetic binders differing from the polymers prepared according to the invention, in particular emulsion polymers which can be prepared by emulsion polymerization. In this context, starch-based binders are to be understood as meaning any native, modified or degraded starch. Native starches may consist of amylose, amylopectin or mixtures thereof. Modified starches may be oxidized starch, starch esters or starch ethers. The molecular weight of the starch can be reduced by hydrolysis (degraded starch). Oligosaccharides or dextrins are suitable degradation products. Preferred starches are cereal, corn and potato starch. Cereal and corn starch are particularly preferred and cereal starch is very particularly preferred.

The further synthetic binders differing from the polymers prepared according to the invention preferably comprise at least 40% by weight, preferably at least 60% by weight, particularly preferably at least 80% by weight, of so-called main monomers.

The main monomers are selected from C1-C20-alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers. Alkyl(meth)acrylates having a C1-C10-alkyl radical, such as methyl methacrylate, methyl acrylate, n-butyl acrylate, ethyl acrylate and 2-ethylhexyl acrylate, may be mentioned by way of example. In particular, mixtures of the alkyl(meth)acrylates are also suitable. Vinyl esters of carboxylic acids having 1 to 20 carbon atoms are, for example, vinyl laurate, vinyl stearate, vinyl propionate, vinyl versatate and vinyl acetate. Suitable vinylaromatic compounds are vinyltoluene, α- and p-methylstyrene, α-butylstyrene, 4-n-butylstyrene, 4-n-decylstyrene and preferably styrene. Examples of nitriles are acrylonitrile and methacrylonitrile. The vinyl halides are ethylenically unsaturated compounds substituted by chlorine, fluorine or bromine, preferably vinyl chloride and vinylidene chloride. For example, vinyl methyl ether or vinyl isobutyl ether may be mentioned as vinyl ethers. Vinyl ethers of alcohols comprising 1 to 4 carbon atoms are preferred. Ethylene, propylene, butadiene, isoprene and chloroprene may be mentioned as hydrocarbons having 2 to 8 carbon atoms and one or two olefinic double bonds.

Preferred main monomers are C1-C10-alkyl(meth)acrylates and mixtures of alkyl(meth)acrylates with vinylaromatics, in particular styrene, or hydrocarbons having two double bonds, in particular butadiene, or mixtures of such hydrocarbons with vinylaromatics, in particular styrene. In the case of mixtures of aliphatic hydrocarbons (in particular butadiene) with vinylaromatics (in particular styrene), the ratio may be, for example, from 10:90 to 90:10, in particular from 20:80 to 80:20. Particularly preferred main monomers are butadiene and the above mixtures of butadiene and styrene.

In addition to the main monomers, the emulsion polymer which is suitable as a binder may comprise further monomers, for example monomers having carboxyl, sulfo or phosphonic acid groups. Carboxyl groups are preferred. For example, acrylic acid, methacrylic acid, itaconic acid, maleic acid or fumaric acid may be mentioned. The content of ethylenically unsaturated acids in the emulsion polymer is in general less than 10% by weight, preferably less than 8% by weight and at least 0.1% by weight or at least 1% by weight. Further monomers are, for example, also monomers comprising hydroxyl groups, in particular C1-C10-hydroxyalkyl(meth)acrylates, or amides, such as (meth)acrylamide.

With the use of synthetic binders, natural binders, such as starch, can also be concomitantly used but are not absolutely essential.

Paper coating slips according to the invention may additionally comprise further additives and assistants, for example fillers, cobinders and thickeners for further optimization of viscosity and water retention, optical brighteners, dispersants, surfactants, lubricants (e.g. calcium stearate and waxes), neutralizing agents (e.g. NaOH or ammonium hydroxide) for pH adjustment, antifoams, deaerating agents, preservatives (e.g. biocides), leveling agents, dyes (in particular soluble dyes), etc. Suitable thickeners in addition to synthetic polymers (e.g. crosslinked polyacrylate) are in particular celluloses, preferably carboxymethylcellulose. Optical brighteners are, for example, fluorescent or phosphorescent dyes, in particular stilbenes.

The paper coating slip is preferably an aqueous paper coating slip; it comprises water, in particular through the form of preparation of the constituents itself (aqueous polymer dispersions, aqueous pigment slurries); the desired viscosity can be established by addition of further water. Customary solids contents of the paper coating slips are in the range from 30 to 70% by weight. The pH of the paper coating slip is preferably adjusted to values of from 6 to 10, in particular from 7 to 9.5.

An embodiment of the invention relates to a paper coating slip, the polymers of the aqueous polymer dispersion prepared according to the invention being used in an amount of from 1 to 50 parts by weight, based on the total amount of pigments, and the pigments being present in an amount of from 80 to 95 parts by weight, based on the total solids content, and being selected from the group consisting of calcium sulfate, calcium aluminate sulfate, barium sulfate, magnesium carbonate, calcium carbonate, silicic acids, aluminium oxides, aluminium hydroxide, silicates, titanium dioxide, zinc oxide, kaolin, alumina, talc and silicone dioxide, and the paper coating slip additionally comprising at least one assistant selected from the group consisting of thickeners, further polymeric binders, cobinders, optical brighteners, fillers, leveling agents, dispersants, surfactants, lubricants, neutralizing agents, antifoams, deaerating agents, preservatives and dyes.

The invention also relates to paper or cardboard coated with a paper coating slip according to the invention and to a process for coating paper or cardboard,
 an aqueous polymer dispersion being prepared according to the invention; and
 a paper coating slip being prepared with this Polymer dispersion, at least one pigment and optionally further assistants; and the paper coating slip being applied to at least one surface of paper or cardboard.

The paper coating slip is preferably applied to uncoated base papers or uncoated cardboard. The amount is in general from 1 to 50 g, preferably from 5 to 30 g (solid, i.e. without water or other solvents which are liquid at 21° C., 1 bar) per square meter. The coating can be effected by customary application methods, for example by means of a size press, film press, blade coater, airbrush, knife coater, curtain coating method or spray coater. Depending on the pigment system, the aqueous dispersions of the water-soluble copolymers in paper coating slips can be used for the basecoat and/or for the topcoat.

In the preparation process according to the invention, coagulum formation is substantially suppressed. Paper coating slips according to the invention have good performance characteristics. They have good running behavior in paper coating processes and a high binding power. The coated papers and cardboards have a good surface resistance, in particular a very high wet and dry pick resistance. They can be readily printed on in the customary printing processes, such as relief printing, gravure printing, offset printing, digital printing, inkjet printing, flexographic printing, newspaper printing, letterpress printing, sublimation printing, laser printing, electrophotographic printing or a combination of these printing processes.

EXAMPLES

Unless evident otherwise from the context, the data in percent are always percent by weight. A stated content relates to the content in aqueous solution or dispersion.

The solids contents are determined by drying a defined amount of the respective aqueous copolymer dispersion (about 5 g) at 140° C. in a drying oven to a constant weight. In each case two separate measurements are carried out and the mean value is calculated.

The glass transition temperature is determined according to DIN 53765 by means of a DSC820 apparatus, Series TA8000, from Mettler-Toledo Int. Inc.

The amount of coagulum in the dispersion is based on particles whose diameter is >45 μm. It is determined by filtering the prepared dispersion through a sieve having a known pore diameter.

The average particle diameters of the polymer particles are determined by dynamic light scattering on a 0.005 to 0.01% strength by weight aqueous polymer dispersion at 23° C. by means of an Autosizer IIC from Malvern Instruments, England. The average diameter of the cumulant evaluation (cumulant z-average) of the measured autocorrelation function (ISO standard 13321) is stated.

The intrinsic viscosity ηi is determined according to DIN EN.1628 at a temperature of 23° C.

The following starting materials were used in the examples:

Emulsifier A: arylsulfonate (Disponil® LDPS 20 from Cognis)

Degraded starch A: commercially available 67% strength aqueous maltodextrin having an intrinsic viscosity ηi of 0.052 dl/g

Example 1

Comparative Example, Acrylonitrile Metered in from the Beginning

In a 6 l pressure reactor, equipped with an MIG stirrer and 3 metering devices, 320 g of deionized water, 41 g of a 33% strength by weight aqueous polystyrene seed (particle size 30 nm), 16 parts by weight of emulsifier A, 1080 g of the degraded starch A were initially taken at room temperature and under a nitrogen atmosphere and in each case 5% by weight of the feeds 1A and 1B were initially taken. Thereafter, the reactor content was heated to 90° C. with stirring (180 rpm). As soon as a temperature of 85° C. had been reached, 128 g of a 7% strength by weight aqueous sodium persulfate solution were added. After 10 minutes, beginning at the same time, the total amount of feed 1A and feed 1B was metered in continuously in the course of 360 minutes and feed 2 in the course of 390 minutes at constant flow rates. Over the total metering time, the streams of feed 1A and feed 1B were homogenized shortly before entering into the reactor. Thereafter, the reactor content was left to continue reacting for a further 2 hours at 90° C. Thereafter, the reactor content was cooled to room temperature, a pH of 6.5 was established with a 15% strength by weight aqueous NaOH and the pressure container was let down to atmospheric pressure.

Feed 1A
Homogeneous mixture of
836 g of deionized water
12 g of a 15% strength by weight aqueous sodium dodecylsulfate solution
72 g of acrylic acid
9 g of itaconic acid
Feed 1B
Homogeneous mixture of
900 g of styrene
126 g of acrylonitrile
18 g of tert-dodecyl mercaptan
702 g of butadiene
Feed 2
257 g of a 3.5% strength by weight aqueous sodium persulfate solution The aqueous dispersion (D1) obtained has formed an enormous amount of coagulum during the postpolymerization time. The coagulum formed was separated from the dispersion by filtration over a sieve (mesh size 100 microns).

Example 2

Comparative Example, Acrylonitrile Metered in from the Beginning

In a 6 l pressure reactor, equipped with an MIG stirrer and 3 metering devices, 593 g of deionized water, 41 g of a 33% strength by weight aqueous polystyrene seed (particle size 30 nm, with 16 parts by weight of emulsifier Disponil® LDPS 20 from Cognis), and 806 g of a 67% strength by weight maltodextrin (Roclys C1967S, Roquette) and in each case 5% by weight of the feeds 1A and 1B were initially taken at room temperature and under a nitrogen atmosphere. The reactor content was then heated to 90° C. with stirring (180 rpm) and, on reaching 85° C., 128 g of a 7% strength by weight aqueous sodium persulfate solution were added. After 10 minutes, beginning at the same time, the total amount of feed 1A and feed 1B was metered in continuously in the course of 360 minutes and feed 2 in the course of 390 minutes at constant flow rates. Over the total metering time, the streams of feed 1A and feed 1B were homogenized shortly before entering into the reactor. Thereafter, the reactor content was reacted for a further 2 hours at 90° C. The reactor content was then cooled to room temperature, a pH of 6.5 was established with a 15% strength by weight aqueous NaOH and the pressure container was let down to atmospheric pressure.

Feed 1A
Homogeneous mixture of
837 g of deionized water
14 g of a 15% strength by weight aqueous sodium dodecylsulfate solution
72 g of acrylic acid
9 g of itaconic acid
Feed 1B
Homogeneous mixture of
882 g of styrene
72 g of acrylonitrile
20 g tert-dodecyl mercaptan
793 g of butadiene
Feed 2
257 g of a 3.5% strength by weight aqueous sodium persulfate solution The aqueous dispersion (D2) obtained had a solids content of 52.4% by weight, based on the total weight of the aqueous dispersion, and comprised 470 ppm of coagulum. Owing to the high coagulum content, the dispersion could not be filtered. The glass transition temperature was determined as 5° C. and the average particle size as 160 nm.

Example 3

Acrylonitrile Metered in Subsequently

In a 6 l pressure reactor, equipped with an MIG stirrer and 3 metering devices, 320 g of deionized water, 41 g of a 33% strength by weight aqueous polystyrene seed (particle size 30 nm), 16 parts by weight of emulsifier A, 1080 g of the degraded starch A were initially taken at room temperature and under a nitrogen atmosphere and in each case 5% by weight of the feeds 1A and 1B were initially taken. Thereafter, the reactor content was heated to 90° C. with stirring (180 rpm). As soon as a temperature of 85° C. had been reached, 128 g of a 7% strength by weight aqueous sodium persulfate solution were added. After 10 minutes, beginning at the same time, the total amount of feed 1A and feed 1B was metered in continuously in the course of 360 minutes and feed 2 in the course of 390 minutes at constant flow rates. Over the total metering time, the streams of feed 1A and feed 1B were homogenized shortly before entering into the reactor. Feed 1C was metered in continuously over 240 min only 120 min after the start of feed 1A and 1B. Thereafter, the reactor content was left to continue reacting for a further 2 hours at 90° C. Thereafter, the reactor content was cooled to room temperature, a pH of 6.5 was established with a 15% strength by weight aqueous NaOH and the pressure container was let down to atmospheric pressure. The coagulum formed was separated from the dispersion by filtration over a sieve (mesh size 100 microns).

Feed 1A
Homogeneous mixture of
836 g of deionized water
12 g of 15% strength by weight aqueous sodium dodecyl-sulfate solution
72 g of acrylic acid
9 g of itaconic acid
Feed 1B
Homogeneous mixture of
900 g of styrene
18 g of tert-dodecyl mercaptan
702 g of butadiene
Feed 1C
126 g of acrylonitrile
Feed 2
257 g of a 3.5% strength by weight aqueous sodium persulfate solution The aqueous dispersion (D3) obtained had a solids content of 52% by weight, based on the total weight of the aqueous dispersion, and comprised 21 ppm of coagulum. The glass transition temperature was determined as 3° C. and the particle size as 140 nm.

Example 4

Acrylonitrile Metered in Subsequently

In a 6 l pressure reactor, equipped with an MIG stirrer and 3 metering devices, 593 g of deionized water, 41 g of a 33% strength by weight aqueous polystyrene seed (particle size 30 nm, with 16 parts by weight of emulsifier Disponil® LDPS 20 from Cognis), and 806 g of a 67% strength by weight maltodextrin (Roclys C1967S, Roquette) and in each case 5% by weight of the feeds 1A and 1B were initially taken at room temperature and under a nitrogen atmosphere. The reactor content was then heated to 90° C. with stirring (180 rpm) and, on reaching 85° C., 128 g of a 7% strength by weight aqueous sodium persulfate solution were added. After 10 minutes, beginning at the same time, the total amount of feed 1A and feed 1B was metered in continuously in the course of 360 minutes and feed 2 in the course of 390 minutes at constant flow rates. Over the total metering time, the streams of feed 1A and feed 1B were homogenized shortly before entering into the reactor. Feed 1C was metered in continuously over 240 min only 120 min after the start of feed 1A and 1B. Thereafter, the reactor content was reacted for a further 2 hours at 90° C. The reactor content was then cooled to room temperature, a pH of 6.5 was established with a 15% strength by weight aqueous NaOH and the pressure container was let down to atmospheric pressure.

Feed 1A
Homogeneous mixture of
837 g of deionized water
14 g of 15% strength by weight aqueous sodium dodecyl sulfate solution
72 g of acrylic acid p 9 g of itaconic acid
Feed 1B
Homogeneous mixture of
882 g of styrene
20 g of tert-dodecyl mercaptan
793 g of butadiene
Feed 1C
72 g of acrylonitrile
Feed 2
257 g of a 3.5% strength by weight aqueous sodium persulfate solution The aqueous dispersion (D4) obtained had a solids content of 52.4% by weight, based on the total weight of the aqueous dispersion, and comprised 12 ppm of coagulum. The glass transition temperature was determined as 6° C. and the particle size as 155 nm.

Example 5

Comparative Example Without Acrylonitrile

In a 6 l pressure reactor, equipped with an MIG stirrer and 3 metering devices, 643 g of deionized water, 537 g of the degraded starch A and in each case 5% by weight of the feeds 1A and 1B were initially taken at room temperature and under a nitrogen atmosphere. Thereafter, the reactor content was heated to 90° C. with stirring (180 rpm) and, on reaching 85° C., 129 g of a 7% strength by weight aqueous sodium persulfate solution were added. After 10 minutes, beginning at the same time, the remaining amount (in each case 95%) of feed 1A and feed 1B was metered in continuously in the course of 360 minutes and feed 2 in the course of 390 minutes at constant flow rates. Over the total metering time, the streams of feed 1A and feed 1B were homogenized shortly before entering into the reactor. Thereafter, the reactor content was left to continue reacting for a further 2 hours at 90° C. Thereafter, the reactor content was cooled to room temperature, a pH of 6.5 was established with a 15% strength by weight aqueous NaOH and the pressure container was let down to atmospheric pressure.

Feed 1A
Homogeneous mixture of
642 g of deionized water
12 g of 15% strength by weight aqueous sodium dodecyl-sulfate solution
72 g of acrylic acid
9 g of itaconic acid
Feed 1B
Homogeneous mixture of
1026 g of styrene
22 g of tert-dodecyl mercaptan
693 g of butadiene
Feed 2
360 g of a 3.5% strength by weight aqueous sodium persulfate solution The aqueous dispersion (D5) obtained had a solids content of 51% by weight, based on the total weight of the aqueous dispersion, and comprised 8 ppm of coagulum. The glass transition temperature was determined as 10° C. and the particle size as 137 nm. The aqueous polymer dispersions prepared according to the examples are used as binders for paper coating slips.

Preparation of the Paper Coating Slips:

The coating slip is prepared in a stirred unit into which the individual components are fed in succession. The pigments are added in predispersed form (slurry). The other components are added after the pigments, the sequence corresponding to the sequence in the stated coating slip formulation. The final solids content is established by the addition of water.

Coating Slip Formulation:

70 parts of finely divided carbonate (Hydrocarb 90, Omya)
30 parts of finely divided clay (Hydragloss 90, Omya)
10 parts of coating slip binder (emulsion polymers of examples 1-5)
0.5 part of rheology assistant (carboxymethylcellulose)

Coating Slip Data:
Solids content 66%
Viscosity (Brookfield RVT, Spindle 4, 100 rpm): 1000-1400 mPas The coating slip is applied by means of a laboratory coating machine to one side of a coating paper and is dried by means of an IR radiator. The weight of the applied coat is about 10 g/m².

The coated paper was investigated with regard to the surface resistance by test methods known to the person skilled in the art. The following test methods were used:

IGT dry pick resistance
IGT wet pick resistance
Prüfbau offset test.

The results are summarized in the table below.

Offset Test

The test is carried out on a "Prüfbau" proof printer. Samples having a size of 240×46 mm are cut in the longitudinal direction from the papers to be tested and are fixed on a proof sheet support. The paper is printed in the device with an impression cylinder at a speed of 1 m/s. The amount of ink is chosen so that a solid ink area results. The printed paper strip is brought back to the starting position after the first print pass and is brought into contact again with the same impression cylinder after a predetermined time (10 s, 30 s). This process is repeated several times, a maximum of 6 passes being implemented. After each pass, the printed area is checked visually for picks. The table shows the number of passes before picking occurs for the first time and the interval between the passes. The larger the number of passes before the occurrence of picking, the more suitable are the papers for offset printing.

Dry Pick Resistance with the IGT Proof Printer (IGT Dry)

Strips were cut from the papers to be tested and were printed with the IGT proof printer. Printing inks used are special test inks from Lorillieux which transmit different tensile forces. The test strips are passed with continuously increasing speed (maximum speed 200 cm/s) through the printing unit. In the evaluation, the position where 10 picks from the paper surface (pick points) have occurred after the beginning of printing is determined on the proof strip. The speed in cm/sec which was present at this position during printing, and the test ink used, are stated as a measure of the dry pick resistance. The higher this printing speed at the tenth pick point, the better the rating of the quality of a paper surface.

Wet Pick Resistance with the IGT Proof Printer (IGT Wet)

Strips were cut from the papers to be tested and were printed with the IGT proof printer. The printer was set up so that the test strips are moistened with water before the printing process. Printing inks used are special test inks from Lorillieux, which transmit different tensile forces. The printing is carried out at a constant speed of 0.6 cm/s. Picks from the paper surface are visible as unprinted areas. For determining the wet pick resistance, the ink density in comparison with a solid hue is determined in percent using a color densitometer. The higher the stated ink density, the better the wet pick resistance.

|  | Dry pick resistance in cm/s | Wet pick resistance in % | Offset test |
|---|---|---|---|
| Example 1 (comparison) | x1) | x1) | x1) |
| Example 2 (comparison) | 130 | 83 | 3 |
| Example 3 | 144 | 92 | 4 |
| Example 4 | 139 | 95 | 5 |
| Example 5 (comparison) | 122 | 69 | 4 | x1) strongly coagulated, no test possible

We claim:

1. An aqueous polymer dispersion, obtained by a process comprising:
   copolymerizing monomers comprising
   (a) at least one vinylaromatic compound,
   (b) at least one conjugated aliphatic diene, and
   (c) at least one ethylenically unsaturated carbonitrile,
   in an aqueous medium as a polymerization mixture,
   in the presence of a degraded starch and of at least one free radical initiator,
   wherein at least a part of said monomers (a) and (b) differing from said ethylenically unsaturated carbonitriles (c) and which are copolymerized with monomer (c) are polymerized before the ethylenically unsaturated carbonitriles (c) are added to the polymerization mixture.

2. The aqueous polymer dispersion of claim 1, wherein the monomers comprise
   (a) from 19.8 to 80 parts by weight of the at least one vinylaromatic compound,
   (b) from 19.8 to 80 parts by weight of the at least one conjugated aliphatic diene,
   (c) from 0.1 to 19 parts by weight of the at least one ethylenically unsaturated carbonitrile,
   (d) from 0.1 to 10 parts by weight of at least one ethylenically unsaturated acid, and
   (e) from 0 to 20 parts by weight of at least one other monoethylenically unsaturated monomer, and
   wherein a sum of the parts by weight of the monomers (a) to (e) is 100.

3. The aqueous polymer dispersion of claim 1, wherein at least 30% by weight of the at least one initiator are initially taken together with the degraded starch in the aqueous medium to obtain an intermediate mixture, and then
   the monomers and a remaining amount of the at least one initiator are metered into the intermediate mixture under polymerization conditions.

4. The aqueous polymer dispersion of claim 1, wherein at least 10% by weight, based on a total amount of all monomers, of the monomers differing from the at least one ethylenically unsaturated carbonitrile are initially taken in the aqueous medium or are added to the polymerization mixture before adding the at least one ethylenically unsaturated carbonitrile.

5. The aqueous polymer dispersion of claim 1, wherein from 1 to 10% by weight, based on a total amount of all monomers, of monomers differing from the at least one ethylenically unsaturated carbonitrile are initially taken in the aqueous medium.

6. The aqueous polymer dispersion of claim 1, wherein the degraded starch comprises a degraded native starch having an intrinsic viscosity ηi of less than 0.07 dl/g.

7. The aqueous polymer dispersion of claim 1, wherein the vinylaromatic compound is at least one selected from the group consisting of styrene and methylstyrene,
- the conjugated aliphatic diene is at least one selected from the group consisting of 1,3-butadiene and isoprene,
- the ethylenically unsaturated carbonitrile is at least one selected from the group consisting of acrylonitrile and methacrylonitrile, and
- the ethylenically unsaturated acid is at least one selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, sulfopropyl methacrylate, vinylphosphonic acid, and a salt of any of these acids.

8. The aqueous polymer dispersion of claim 1, wherein the monomers comprise
   (a) from 25 to 70 parts by weight of at least one selected from the group consisting of styrene and methylstyrene,
   (b) from 25 to 70 parts by weight of at least one selected from the group consisting of 1,3-butadiene and isoprene,
   (c) from 1 to 19 parts by weight of at least one selected from the group consisting of acrylonitrile and methacrylonitrile,
   (d) from 0.1 to 10 parts by weight of at least one ethylenically unsaturated acid selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, and sulfopropyl methacrylate, and
   (e) from 0 to 20 parts by weight of at least one other monoethylenically unsaturated monomer, and
   wherein a sum of the parts by weight of the monomers (a) to (e) is 100.

9. The aqueous polymer dispersion of claim 1, wherein from 15 to 60 parts by weight of a degraded starch are employed per 100 parts by weight of the monomers.

10. The polymer dispersion of claim 1, having a solids content is greater than 55% by weight.

11. A binder, an adhesive, a size suitable for at least one fiber, a covering, or a paper coating slip, comprising the dispersion of claim 1.

12. A paper coating slip, comprising
   (i) at least one inorganic pigment and
   (ii) the aqueous polymer dispersion of claim 1.

13. The paper coating slip of claim 12, wherein polymers of the aqueous polymer dispersion are present in an amount from 1 to 50 parts by weight, based on a total amount of pigments,
   wherein the at least one pigment is present in an amount of from 80 to 95 parts by weight, based on a total solids content, and is selected from the group consisting of calcium sulfate, calcium aluminate sulfate, barium sulfate, magnesium carbonate, calcium carbonate, a silicic acid, an aluminum oxide, aluminum hydroxide, a silicate, titanium dioxide, zinc oxide, kaolin, alumina, talc, and silicon dioxide, and
   wherein the paper coating slip additionally comprises at least one assistant selected from the group consisting of a thickener, a further polymeric binder, a cobinder, an optical brightener, a filler, a leveling agent, a dispersant, a surfactant, a lubricant, a neutralizing agent, an antifoam, a deaerating agent, a preservative, and die.

14. A paper or cardboard coated with the paper coating slip of claim 12.

15. A process for coating paper or cardboard, the process comprising:
   preparing a paper coating slip with the aqueous polymer dispersion of claim 1, at least one pigment, and optionally, at least one further assistant; and
   applying the paper coating slip to at least one surface of the paper or cardboard.

* * * * *